(12) United States Patent
Adams et al.

(10) Patent No.: US 10,181,951 B2
(45) Date of Patent: Jan. 15, 2019

(54) PROTECTED ENCRYPTION KEY RECOVERY

(71) Applicant: BlackBerry Limited, Waterloo (CA)

(72) Inventors: Neil Patrick Adams, Waterloo (CA); David Bajar, Kitchener (CA)

(73) Assignee: BlackBerry Limited, Waterloo, Ontario (CA)

(*) Notice: Subject to any disclaimer, the term of this patent is extended or adjusted under 35 U.S.C. 154(b) by 126 days.

(21) Appl. No.: 15/154,218

(22) Filed: May 13, 2016

(65) Prior Publication Data

US 2017/0331628 A1  Nov. 16, 2017

(51) Int. Cl.
H04L 9/08 (2006.01)
H04L 9/14 (2006.01)

(52) U.S. Cl.
CPC .......... H04L 9/0897 (2013.01); H04L 9/0822 (2013.01); H04L 9/0863 (2013.01); H04L 9/14 (2013.01)

(58) Field of Classification Search
CPC ....... H04L 9/0897; H04L 9/14; H04L 9/0863; H04L 9/0894
See application file for complete search history.

(56) References Cited

U.S. PATENT DOCUMENTS

| 6,266,421 | B1* | 7/2001 | Domyo | H04L 9/0894 380/282 |
| 6,754,349 | B1* | 6/2004 | Arthan | H04L 9/0894 380/268 |
| 9,634,999 | B1* | 4/2017 | Marion | H04L 63/0838 |
| 2009/0268915 | A1* | 10/2009 | Kelly | H04L 9/0877 380/282 |
| 2013/0148810 | A1* | 6/2013 | Goel | H04L 9/0891 380/278 |
| 2014/0006806 | A1* | 1/2014 | Corella | G06F 21/6218 713/193 |

* cited by examiner

Primary Examiner — Ellen Tran
(74) Attorney, Agent, or Firm — Jeffrey N. Giunta; Fleit Gibbons Gutman Bongini & Bianco P.L.

(57) ABSTRACT

A system and method for supporting encryption key retrieval. A first digital key is created. A first protected key is created by applying a first protection algorithm based on a first user provided password to the first digital key. A first unlock key is created that is separate from the first digital key. A second protected key is created by applying a second protection algorithm based on the first unlock key to the first digital key. The first protected key and the second protected key are stored. The first unlock key is sent to a remote storage and no copy of the unlock key is retained after the sending the first unlock key.

20 Claims, 6 Drawing Sheets

PROTECTED ENCRYPTION KEY RECOVERY

FIELD OF THE DISCLOSURE

The present disclosure generally relates to protection of data encryption keys, and more particularly to recovering protected encryption keys.

BACKGROUND

Data processing equipment and devices are able to store many types of data. Stored data is able to be protected by encrypting the data based on an encryption key. This encryption key is usually also stored on the same device to allow decryption of the stored data that is encrypted so that a user is able to access the original data. This encryption key is also protected by various techniques, such as separately encrypting that encryption key. The stored encryption key is able to be encrypted based on various suitable values, such as a user provided access code or other encryption key.

BRIEF DESCRIPTION OF THE DRAWINGS

The accompanying figures, where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
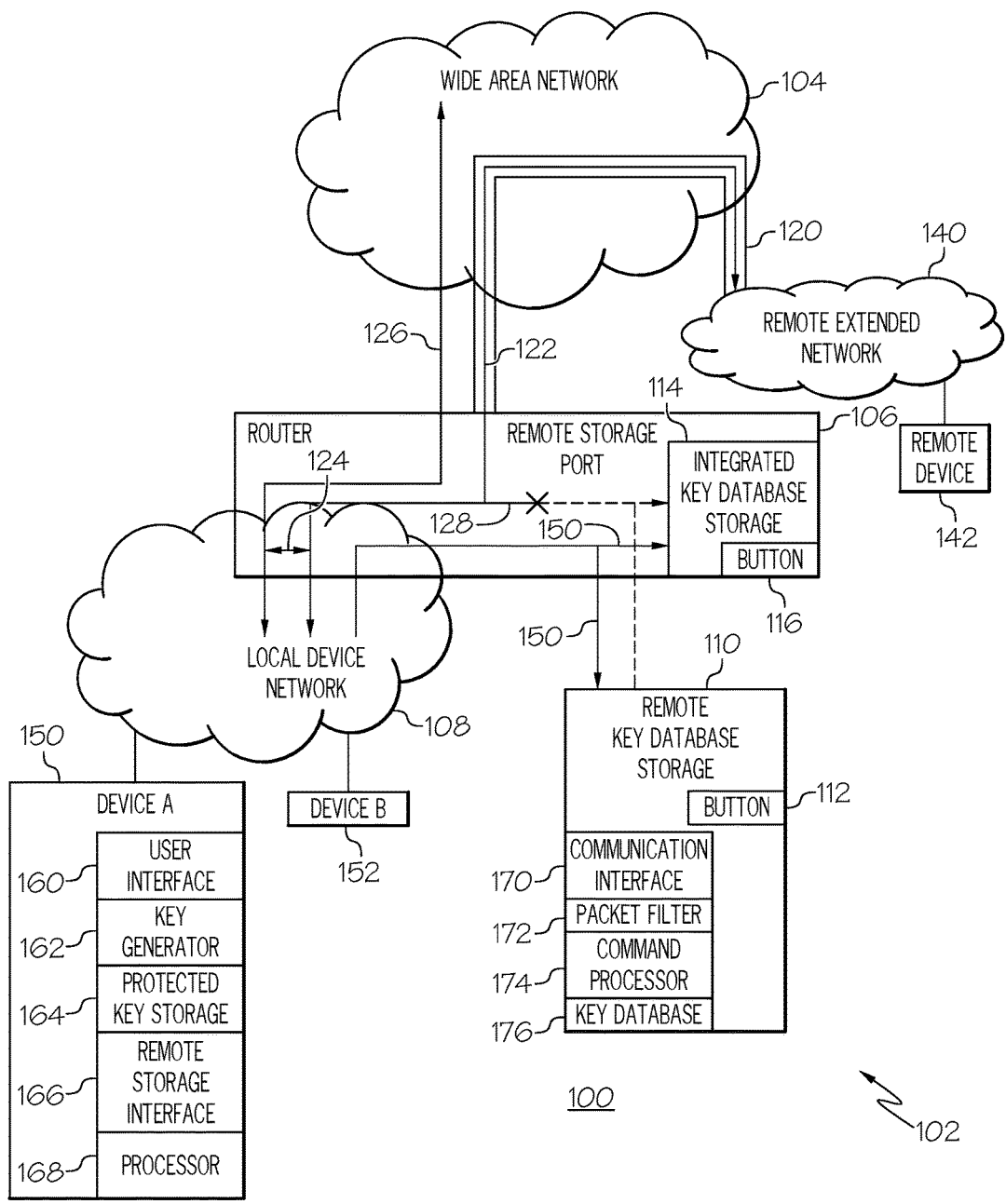
FIG. 1 illustrates a data network configuration, according to an example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the present subject matter in virtually any appropriately detailed structure and function. Further, the terms and phrases used herein are not intended to be limiting, but rather, to provide an understandable description of the concepts.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The below described systems and methods operate to provide an ability for a user to retrieve a cryptographic key used to protect various types of data. In an example, a cryptographic key comprising data values or numbers with a specified number of bits is generated by any suitable technique. That cryptographic key is then used to protect a data set by any suitable technique. In an example, the key is used to protect access to a set of passwords or other keys used to gain access to various systems, data, other entities, or combinations of these. In an example, a centralized access code manager, such as "BlackBerry Password Keeper" provided by BlackBerry, Limited of Waterloo, ON, CA, or other key or password management programs, operates to store a number of passwords or other data used to access data protected by access control functions. These access code managers often encrypt stored versions of the database of access codes that the program manages. Encrypted versions of the database are able to be safely stored in remote locations such as on backup or other data servers.

In the present discussion, the term "password" is intended to broadly encompass any type of authenticator that may be used for authentication and/or to gain access or admission to a resource. A password may be text-based (e.g. wording or a string of characters that may include alphabetical characters, numeric characters, special characters, other characters in any language, or any combinations thereof). The term "password" in this context includes, without limitation, a passcode, passkey, PIN (personal identification number), passphrase (e.g., multiple words), and the like. A password may comprise speech. A password may be non-text-based (e.g. graphical, picture-based, motion-based, biometric). The term "password" also includes, without limitation, symbols, icons, logos, ideograms, pictograms, emoji, emoticons, and the like. A password in some examples may be a combination of text-based and non-text-based data.

In an example, a database storing a set of access codes is encrypted with a cryptographic key. The cryptographic key is able to be a cryptographic key defined by any technique and is an example of a "digital key." In some examples, this digital key is a random or pseudo-random number with a specified number of bits. In order to access the database of access codes, such as a data set storing passwords or other data, the access code manager in some examples uses this digital key to decrypt the stored database of access codes and access desired access codes. The appropriate access code is then used to allow the user to access programs or other functions protected by the accessed access code or access codes. Because this digital key is used to protect other access codes, it is referred to as a "master key." In an example, a master key is similar to other digital keys that are able to be protected according to the principles described herein. The following discussion describes systems and methods used to protect a digital key with an example of protecting a master key used by a system. It is clear that the principles of the following discussion are able to be applied to protect any type of digital key or access code that is able to be used for any scenario or application.

In an example, the digital key that is the master key is itself encrypted or otherwise protected to keep unauthorized persons from obtaining the master key and thereby being able to access the database of access codes that is encrypted by the master key. In an example, the master key is encrypted or otherwise protected based on a user supplied password or other user entered data. In such a case, the encrypted master key is stored without the user supplied password and extracting the original master key is based on the user's re-entry of that same user supplied password. If the user forgets that password used to protect the master key, the encrypted master key is unrecoverable and the database of access codes protected by that master key cannot be decrypted. In some cases, all data that requires those access codes may be lost to the user. In some examples, remotely storing a master key that is encrypted based on a user provided password may not be desired.

In some examples, the below described systems and methods store a second encrypted copy of the digital key that is the master key. This second encrypted copy in an example is encrypted with an "unlock key." The unlock key in some examples is a random or pseudo-random number generated by the user's device and is used as an encryption key to encrypt the master key. This second encrypted copy of the master key is then also stored in the user's device with backups or other copies stored in suitable locations such as in network accessible storage. The unlock key, however, is sent to a remote data storage and is not stored in any location containing the second encrypted copy of the master key, such as on the user's device or with remotely stored backup copies of the second encrypted copy of the master key.

In an example of the scenario described above, two differently encrypted or protected copies of the master key are stored or accessible to the user's device. One copy is protected by the user's entered password. Another copy is protected by the unlock key. Neither of the keys used to extract the master key from these two encrypted master keys is stored with the encrypted copies of the master key, such as on the user's device. Because neither key is stored with the encrypted master key copies, an unauthorized person accessing the device or otherwise obtaining these stored protected copies of the master key cannot extract the master key to access the protected data, such as the access codes stored in an encrypted database.

The access codes in the encrypted database are normally able to be used by an authorized user by correctly entering the user's supplied password to allow the master key to be extracted from a stored copy that is protected by that password. If the user is unable to remember the user's supplied password, the user in the above example is able to extract the master key from the second encrypted copy of the master key by obtaining the unlock key from the remote storage to which it was sent. In some examples as are described below, access to the remote storage to which the unlock key was sent, and which stores the unlock key, is able to be restricted in various ways.

In an example, the remote storage to which unlock keys are sent is connected to a local data communications network, such as a Local Area Network (LAN). In various examples, various techniques are used to cause the remote storage to only respond to requests to retrieve an unlock key that originate from devices connected to the same LAN as the remote storage. In an example, the equipment controlling and managing communications among the devices connected to the LAN are configured to only allow communications with the remote storage to originate from devices that are directly connected to equipment implementing the LAN. In an example, the LAN is configured to only allow devices connected to equipment such as a wireless router or other communications device that implement the local data communications network to communicate with the remote storage.

As is familiar to practitioners of ordinary skill in the relevant arts, configurations of devices forming the local network are able to allow less restricted communications between or among devices that are connected to the local network as opposed to communications with devices that are external to the local network. Devices that are external to the local network, such as devices connected to the Internet, may have restricted access to, or no access to, devices connected to the local network. In an example, a device commonly referred to as a firewall is able to define data communications rules defining communications between devices connected to the local network and devices external to that local network. Restricting communications with the remote storage to only devices connected to communications devices of the local network provides a layer of restriction to accessing the remote storage.

In an example, a LAN is also able to establish connections with devices external to the LAN but allow those devices to be treated as though they are connected to the LAN. An example of such a connection is referred to herein as a remote extended network. In an example, a remote extended network comprises one or more devices that are remote from the LAN but are treated as being part of the LAN by controllers managing communications among devices of the LAN. In an example, a remote extended network is connected via a remote network bridge that uses a data communications tunneling protocol between the remote device and the LAN. In an example, devices connected to the LAN through a remote extended network in an example are also precluded from accessing the remote storage connected to the LAN in order to allow only devices physically present in or near the LAN to access the unlock key and thereby recover the master key using the unlock key.

In addition to limiting communications to devices connected to physical equipment of the local network, accessing the remote storage storing unlock keys is also restricted in some examples to devices that have established a secure and authenticated communications link with a device hosting the remote storage. The secure and authenticated communications link is able to allow the processor of the remote storage to authenticate, and thereby uniquely identify, the device accessing the remote storage when the unlock key is both sent to, and is attempted to be retrieved from, the remote storage. Authenticating the device performing both transactions with the remote storage is able to ensure that the device attempting to retrieve the unlock key is the same device that originally sent the unlock key to the remote storage for storage.

The remote storage in an example is also able to have a physical button or other operator input device that a user is able to physically press in order to confirm that the user is physically present near the remote storage. Confirming that a cooperating user is physically present near the remote storage, by requiring a button on or near the remote storage to be pushed, is able to be an added restriction on accessing unlock keys stored in the remote storage. In an example, the user's device is able to initiate recovery of the master key by requesting the unlock key from the remote storage. The recovery process may then require the user to press the physical button or other input device on or near the remote storage during this recovery process before the remote storage will send the unlock key to the user's device. In various examples, this physical button or other input device is able to be used by other functions of the remote storage or used by another function performed by a device containing the remote storage. In an example, a network router is able to include the remote storage and a button of the network router used to, for example, facilitate paring of a device via a wireless data link to the network router is able to be also used a physical button to be pressed as part of the master key retrieval process.

FIG. 1 illustrates a data network configuration 100, according to an example. The data network configuration 100 depicts a network router 106 that routes and manages communications between and among devices forming a local network 102, which are devices connected to a local area network (LAN) 108 in this example, and a wide area network 104. An example of a wide area network 104 is the worldwide Internet. An example of a local network 102 includes devices connected to a local area network (LAN) 108 and are devices that are identified and defined to include devices connected to a Local Area Network 108 defined by the router 106. These devices are able to connect through the LAN 108 via, for example, wired data links to the router 106, wireless data links connecting to the router 106 as a Local Area Network, other connections, or combinations of these.

In an example, the local device network 108 is able to include data links including a wireless transceiver that is part of the router 106 or that is often in proximity to and communicatively connected to the router 106. A Device A 150 and a Device B 152 are part of the local network 102 in this example and are shown as connected to the local device network 108. In an example, devices, such as Device A 150 and Device B 152, are connected to the local device network 108 by being connected via wired connections to particular ports identified as "local" ports of the router 106 to be part of the LAN. One or more devices, such as one of Device A 150 or Device B 152, is able have a wireless connection with a wireless transceiver that is part of, or connected to, router 106 where devices with wireless connections to that wireless transceiver are also defined to be part of the LAN. An example of such wireless connections includes a wireless network formed by equipment complying with the Wi-Fi® standard. In both of these examples, devices connected either by wired connections to "local" ports of the router 106 or to a wireless transceiver connected to router 106 so as to be defined as part of the LAN.

The illustrated example of Device A 150 depicts examples of processing components contained within a user device. In an example, a user deice such as device A 160 is able to have a processor and suitable data storage memory that operate to implement processing components. As described in detail below, one or more types of memory is able to store programming code to allow a process executing that code to implement particular functions such as those described below. The illustrated Device A 150 in this example includes a user interface 160, a key generator 162, a protected key storage 164, a remote storage interface 166, and a processor 168.

The illustrated data network configuration 100 depicts two remote key database storage entities, a detached remote key database storage 110 and an integrated remote key database storage 114. This depiction is intended to show two alternative remote key database storage entities. In general only one of these remote storage devices is used in a particular configuration. In the following discussion, the term "remote storage" is used to refer to either the detached remote key database storage 110 or to the integrated remote key database storage 114, as well as to similar devices, as may be used in any particular configuration. The term "remote storage" is thus to be understood as being able to refer to any other device that performs similar operations.

In an example, either of the detached remote key database storage 110 or the integrated remote key database storage 114 that is used in a particular configuration is defined to be within the local network 102. In one example, a detached remote key database storage 110 is connected to a "local" port of router 106. In another example, an integrated remote key database storage 114 is recognized by a processor within the router 106 to have a similar connection as devices connected to the "local" ports of router 106. In either example, the remote server is considered to be connected to the local device network 108 and therefore part of the local network 102. As is described in further detail below, the router 106 in an example operates to restrict data communications between either of these remote storage devices and devices that are not on the local network 102, such as devices not connected to the local device network 108. The router 106 in some examples therefore precludes communications between the remote storage and devices connected to the router through the wide area network 104.

The detached remote key database 110 in an example is able to include a processor and memory used to implement various functions. One or more types of memory are able to store programming code to be executed by the processor of the detached remote key database 110 to implement those functions. In an example, the illustrated detached remote key database 110 includes a communications interface 170, a packet filter 172, a command processor 174, and a command processor. In an example, communications interface 170 handles receiving and processing data packets by the detached remote key database 110, as is described below. The packet filter 172 in an examples examines received packets to determined their characteristics, such as the port to which they are addressed, commands contained within the packets, as described below, other packet processing, or combinations of these. The command processor 174, determines key database commands that are included in the received packets, extracts other data sent with or associated with those commands, performs the operations attendant to the received commands, and creates responses and with the data required for those responses. The key database 176 stores and retrieves keys that have been sent to the detached remote key database 110. In various examples, the key database 176 is able to store the keys in protected memory, such as in a TrustZone® portion of memory maintained by some processing architectures. In general, the integrated remote key database storage 114 is also able to include corresponding processing components that are able to be performed by a dedicated processor, a processor performing other functions within the router 106, a multiple processor configuration, or combinations of these.

In general, devices connected to the local device network 108 are able to communicate with any device connected to the wide area network 104 through one or more wide area data links 126. In an example, a firewall within router 106 is able to restrict communications with devices connected to the local device network 108 where those communications originate from devices connected to the wide area network 104. As is understood by practitioners of ordinary skill in the relevant arts, the firewall function in the router 106 is able to define various rules to restrict, limit, otherwise manage, or perform combinations of these with regards to data communications between devices connected to the local device network 108 and the wide area network 104.

The router 106 in some examples is able to establish a remote extended network 140. In some examples, the remote extended network 140 includes devices, such as the illustrated remote device 142, that are able to communicate with the router 106 over the wide area network 104. The router 106 is able to cause the remote device 142 to appear to other network devices as though they are connected to the local device network 108, and thus allow the remote device 142 and devices on the local device network 108 to communicate as though the remote device 142 is present on the local device network 108.

In an example, the router 106 is able to establish a remote network bridge 120 that uses, for example, a data communications tunneling protocol between the router 106 and the remote extended network 140. In one example, the remote network bridge 120 is able to be established between a data routing device, such as a device similar to router 106, that is located at the remote extended network 140. In another example, the remote network bridge 120 is able to be established directly with the remote device 142. In general, any suitable data communications architecture is able to be used to establish a network bridge through the wide area network 104 and a remote device or remote local area network (LAN). For example, any suitable Virtual Private Network (VPN) configuration is able to establish a remote network bridge 120.

Data between the remote device 142 and devices on the local device network 108 is able to be communicated through a remote data link 122 using the remote network bridge 120. The remote data link 122 allows communications with devices connected to the local device network 108. The router 106 in some examples includes processing to allow the remote data link 122 to be coupled inside a firewall of the router 106 to wide area data links 126 through a remote to wide data connection 124. The local to wide data connection 124 allows devices on the remote extended network 140 to have the same protection of the firewall of the router 106 as devices connected to the local device network 108.

In an example, devices not connected to the LAN 108 are referred to as being connected to an external network. In general, devices connected to the Wide Area Network 104 are considered to be connected to an external network since these devices are considered external to the local network 102. In various examples, devices connected to a remote extended network 140 are able to be either connected to an external network or their connection to the remote extended network 140 may be considered different than a connection to an external network.

As is known to practitioners of ordinary skill in the relevant arts, data packets sent over data networks are able to contain identification, referred to by the Transport Control Protocol (TCP) standard as a network "port" number, referred to as a port number below, that identifies the type of data contained in the packet. In the TCP standard, a port is a sixteen (16) bit value. Some port number values are already defined to be associated with common processing functions such as e-mail communications. When a data packet is received from a data network in many devices, the port number of the data packet is used to determine which process is to receive the data within that packet. In general, one or more port numbers are associated with each process that receives data over a network. Routing of data through the router 106 is able to be based on the port number of data packets being communicated through the router 106.

In an example, the remote storage is able to receive key database command which are commands associated with unlock key database operations. The key database commands associated with unlock key database operations include a key storage command that is a command to store an unlock key that is sent with that command, and another command is a key retrieval command that is a command to retrieve and send a stored unlock key to the requesting device that sent that particular command In an example, the remote storage device is configured to only receive such unlock key database commands that are addressed to a particular TCP port number. This particular TCP port number is referred to herein as the unlock key recovery port.

The router 106 in one example is configured to perform special processing of data packets addressed to the unlock key recovery port. In an example, only data packets that originate from the local device network 108 are allowed to send data packets with the unlock key recover port to the remote storage, as is illustrated by the local unlock key recovery request path 150. In an example, however, data packets that originate from the remote extended network 140 and that are addressed to the unlock key recovery port, such as those following the illustrated blocked path 128, are blocked from being delivered to the remote storage. In an example, all data packets originating from the wide area network 104 are blocked from being delivered to the remote storage. In further examples, any suitable data routing configuration is able to be used to restrict unlock key requests from being delivered to the remote storage.

In an example, the remote storage only responds to commands associated with unlock key database operations that are received over an authenticated communications link between the originating device and the remote storage. In an example, an originating device, such as device A 150, is able to store a digital certificate that is used to perform an authentication protocol with the remote storage that uniquely and reliably authenticates the originating device. In some examples, the remote storage further requires a secure, encrypted data link with the originating device in order to respond to commands associated with unlock key database operations. In an example, this secure, encrypted data link is also able to be based on a digital certificate stored in the originating device.

The remote storage in some examples includes a physical button or other user input that requires the physical presence of a user to press or otherwise activate. In some examples, a physical contact input is able to be made with a user input associated with a remote storage. Examples of a physical contact input made with a user input includes a person pressing the illustrated button 112 of the detached remote key database storage 110 or the button 116 of the integrated key database storage 114. In an example, the remote storage is configured to not send an unlock key to a requesting device unless the button 112 or button 116 has been pressed within a certain time interval of receiving the request to retrieve the unlock key.

In an example, when a device sends an unlock key to the remote storage, the remote storage stores the unlock key and returns a transaction identification value. The remote storage in an example is able store the transaction identifier along with authentication information of the device that sent the unlock key to be stored. This authentication information is an example of an identification of the sender of the unlock key. In an example, subsequent requests for that unlock key are required to include that same transaction identification value. A request to retrieve an unlock key and send it to the requesting device may be denied if an incorrect transaction identification value is sent with the request, or the requesting device is using different authentication information than was used when the unlock key was sent. After a certain number of requests denials, in some examples, the remote storage may require the button 112 or button 116 to be pressed in conjunction with an unlock key request before the remote storage will send the unlock key to the requesting device.

Figure 2:
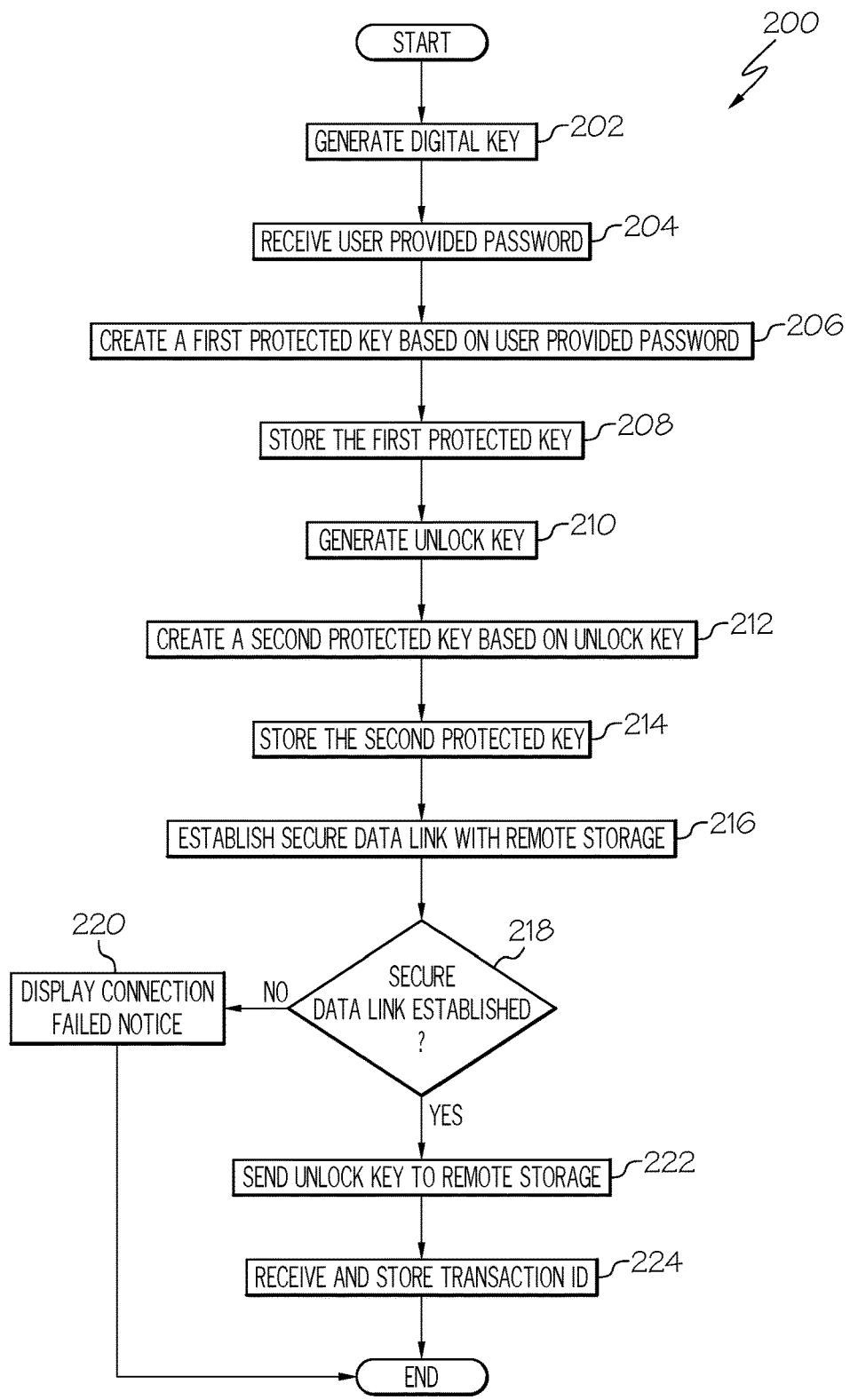
FIG. 2 illustrates a digital key protection process, according to an example.

FIG. 2 illustrates a digital key protection process 200, according to an example. The illustrated digital key protection process 200 is an example of a process used by a user device to create a master key and protect that master key with both a user provided password and with an unlock key that is sent to a remote storage for safe keeping. It is clear that the digital key protection process 200 is able to be used in various examples to create and protect any type of access code, such as any type of digital key, and sending that protected access code or digital key to a remote storage. In general, the digital key protection process 200 is initiated by a user of the user device and the user interacts with a suitable user interface of the user device to provide various inputs to the digital key protection process 200.

The digital key protection process 200 begins by generating, at 202, a digital key. In an example, a digital key is able to be generated by any suitable random or pseudorandom process. With reference to the data network configuration 100, a digital key is able to be generated by the key generator 162 of device A 150. This digital key is able to be used for any purpose. In an example, this digital key is used as a master key to protect an access code database.

The digital key protection process 200 continues by receiving, at 204, a user provided password. The user is able to provide this password by any suitable technique. In an example, the user enters the user provided password by using user interface facilities of the user device performing the digital key protection process 200. With reference to the data network configuration 100, a user provided password is able to be received by the user interface 160 of device A 150. In further examples, the digital key is able to be protected by any suitable authentication technique, such as by an input received from reader that detects a user's fingerprint, an eye scan such as a retina scan of the user, data received from a smart card based authentication technique, an input based on a user's selection of one or more images or a sequence of images presented to the user, a particular gesture performed by the user as captured by an image capturing device or on a touch sensitive input device, by any other technique, or based on combinations of these.

A first protected key is created, at 206. The first protected key is created in an example by applying a first protection algorithm based on the received user provided password to the above generated digital key. The first algorithm in an example is any suitable technique, such as encryption or other protection technique, that uses a user provided password to encrypt or otherwise render unreadable the above generated digital key unless the user provided password is provided. In an example, an encryption key or other data used to protect the above generated digital key is able to be created to cause the algorithm to be based on the above entered user provided password. In an example, the first protection algorithm receives a user provided password and creates a cryptographic key based on applying the Password-Based Key Derivation Function 2 (PBKDF2), as specified by the Internet Engineering Task Force RFC 2898, to that password. The cryptographic key derived from that password is then used in an example to encrypt the digital key. With reference to the data network configuration 100, a first protected key is able to be created by the processor 168 of device A 150.

The first protected key is then stored, at 208. With reference to the data network configuration 100, a first protected key is able to be stored by the protected key storage 164 of device A 150. In various examples, the protected key storage 164 is able to store protected keys in any suitable location. For example, protected keys are able to be stored in a protected memory location, such as a location within a trusted execution environment of various mobile processors, such as is implemented by a TrustZone® of some processors or in a storage provided by a Trusted Platform Module (TPM) of a computer. In further examples, because the protected keys are protected, such as by encryption, the keys are able to be stored in less protected memory locations in some examples. The user provided password is not stored in this example and re-obtaining the original digital key is achieved by the user's entering the same user provided password to support decryption or to otherwise extract the first protected key. In an example, the only storage of the user provided password is in the user's own mind.

An unlock key is generated, at 210. The unlock key is generated in an example by any suitable random or pseudorandom technique. In an example, the unlock key is created with a relatively large number of bits to provide secure protection of the digital key. With reference to the data network configuration 100, a unlock key is able to be generated by the key generator 162 of device A 150.

A second protected key is created, at 212. The second protected key is created by applying a second protection algorithm based on the above created unlock key to the above generated digital key. The second algorithm in an example is any suitable technique, such as encryption or other protection technique, that uses an encryption key, such as the above described unlock key, to encrypt or otherwise render unreadable the above generated digital key unless the unlock key is provided. With reference to the data network configuration 100, the second protected key is able to be created by the processor 168 of device A 150. In an example, the digital key value protected by the unlock key is the same digital key value that is protected by the above described user provided password. The processing to extracting of the original digital key from this second protected key uses this unlock key value, but does not require the user provided password.

The second protected key is stored, at 214. The second protected key is able to be stored without added security since its value is protected, such as by encryption. With reference to the data network configuration 100, a second protected key is able to be stored by the protected key storage 164 of device A 150. Extraction of the original digital key from the second protected key uses the unlock key, which is not stored with the second protected key. In various examples, the second protected key is able to be stored in the user's device and one or more other copies of the second protected key are able to be stored in suitable locations as a backup copy. The unlock key is not stored on the user's device, or with other copies of the second protected key, but is sent to a remote storage for safe storage, as is described in regards to the following processing.

A secure data link with remote storage is established, at 216. This secure data link is an example of a secure data communications path. As described above, such a secure data link is able to include authentication of the device performing the digital key protection process 200. In an example, the secure data link is based on Transport Layer Security (TLS) or an equivalent secure communications protocol. The following discussion uses the common convention of referring TLS protocols by its predecessor Secure Socket Layer (SSL). In general, a reference to an SSL protocol is to be understood as using any suitable security link such as TLS, SSL, other protocols, or combinations of these. With reference to the data network configuration 100, the secure data link is able to be established and maintained by the remote storage interface 166 of device A 150.

A determination is made, at 218, as to whether the secure data link is established. As discussed above with regards to FIG. 1, data communications equipment to which the remote storage is connected may only allow certain devices to communicate with the remote storage. In the above described example, only devices connected to the local device network 108 are able to communicate with the remote storage. Therefore, if the digital key protection process 200 is performed by a device not connected to the local device network 108, but is rather accessing the router 106 through the wide area network 104 or even the remote extended network 140, the secure data link will not be able to be established.

Returning to the determination of whether the secure data link is established, if this determination is false, a "connection failed" notice is displayed, at 220. In an example, the connection failed notice may remind the user of the device that the device is required to be connected to the user's "home network" in order to perform the digital key protection process 200. With reference to the data network configuration 100, this notice is able to be presented on a user interface 160 of device A 150.

If, however, it is determined that the secure data link is established, the unlock key is sent to the remote storage, at 222. The remote storage will respond with a confirmation of the storage of the unlock key. In an example, this confirmation includes a transaction identification value, or "ID," that is used to identify the storage transaction when retrieval of the unlock key from the remote storage is to be performed. This transaction ID is received and stored, at 224. With reference to the data network configuration 100, the transaction ID is able to be received by the remote storage interface 166 and also stored in the protected key storage 164 of device A 150. After receiving and storing the transaction ID, or after displaying the connection failed notice, the digital key protection process 200 ends.

Figure 3:
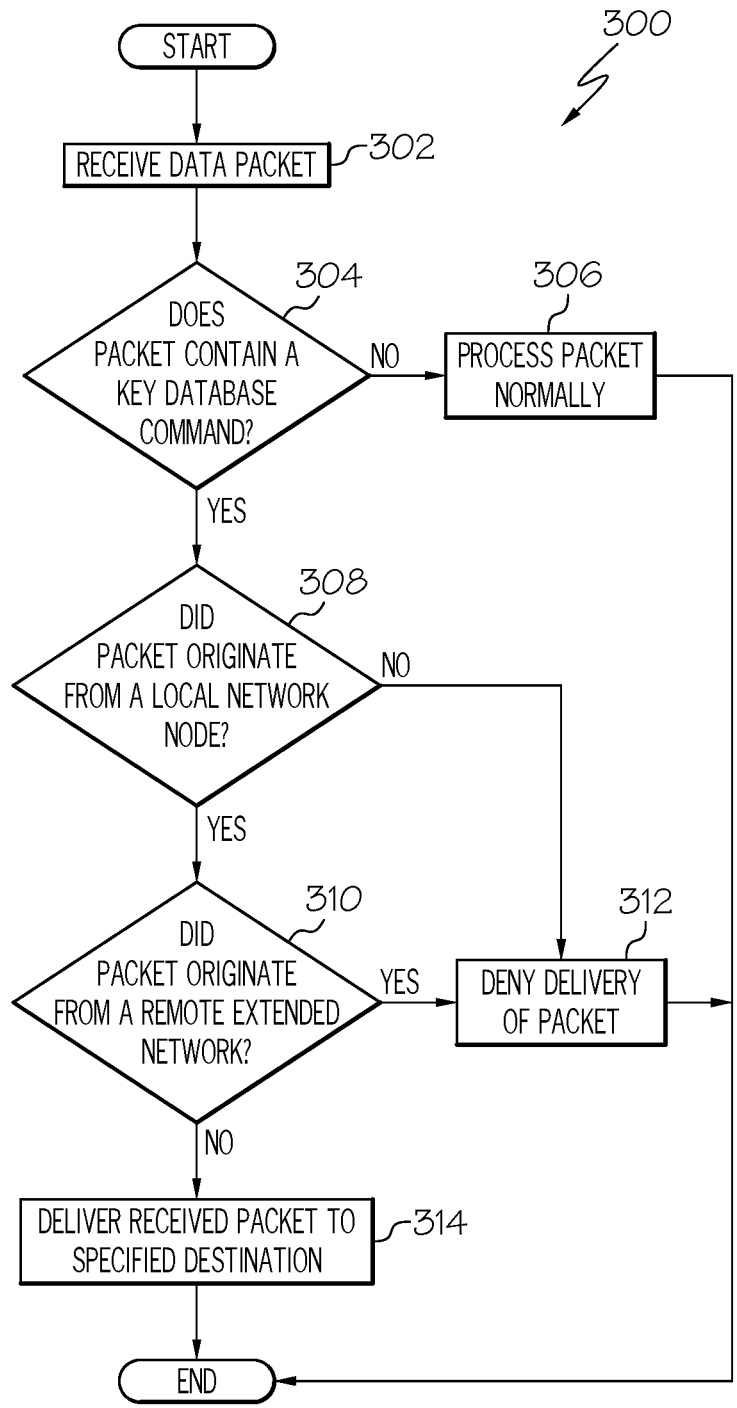
FIG. 3 illustrates a key database packet routing process, according to an example.

FIG. 3 illustrates a key database packet routing process 300, according to an example. The key database packet routing process 300 is an example of a process performed by data communications equipment, such as the above described router 106, when handing packets addressed to a network address associated with a remote storage device, such as either the detached remote key database storage 110 or the integrated remote key database storage 114. In various examples, the key database packet routing process 300 is able to be performed by communications equipment performing data packet routing for multiple devices, is able to be performed by a data packet reception process within the remote storage device, is able to be performed by any suitable device, or by combinations of these.

The key database packet routing process 300 begins by receiving, at 302, a data packet. The data packet is able to be received from any source in communications with the device performing the key database packet routing process 300.

A determination is made, at 304, as to whether the received data packet contains a key database command. In an example, data packets containing key database commands are addressed to a particular defined port number. This determination is able to be made, at least in part, based on the port number of the data packet address being equal to that particular defined port number. In various further examples, this determination is able to be made based on any suitable criteria, such as in Internet Protocol (IP) address of the packet corresponding to a remote storage device, examination of data contained in the packet, any other basis, or any combinations of any of these.

If it is determined that the data packet does not contain a key database command, the packet is processed normally, at 306. In an example, normal processing may apply general firewall rules to handling of the packet. For example, default processing may deny delivery of all packets originating from the wide area network 104.

If it is determined that the data packet does contain a key database command, a determination is made, at 308, if the packet originated from a local network node. This determination is able to be made by any suitable technique, such as determining through which physical data communications port the packet arrived.

If it is determined that the data packet originated from the local network, a determination is made, at 310, if the packet originated from a remote extended network. An example of a remote extended network 140 is described above. In an example, a determination that the packet originated from a remote extended network is able to be based on determining which network route the packet was received from.

If it is determined, at 310, that the data packet did not originate from the local network, or it is determined, at 308, that that the data packet does not contain a key database command, delivery of the packet is denied, at 312. If it is determined, at 310, that the data packet did originate from the local network, the received packet is delivered, at 314, to the specified destination. After delivery of the packet, or denying delivery of the packet, the key database packet routing process 300 ends.

Figure 4:
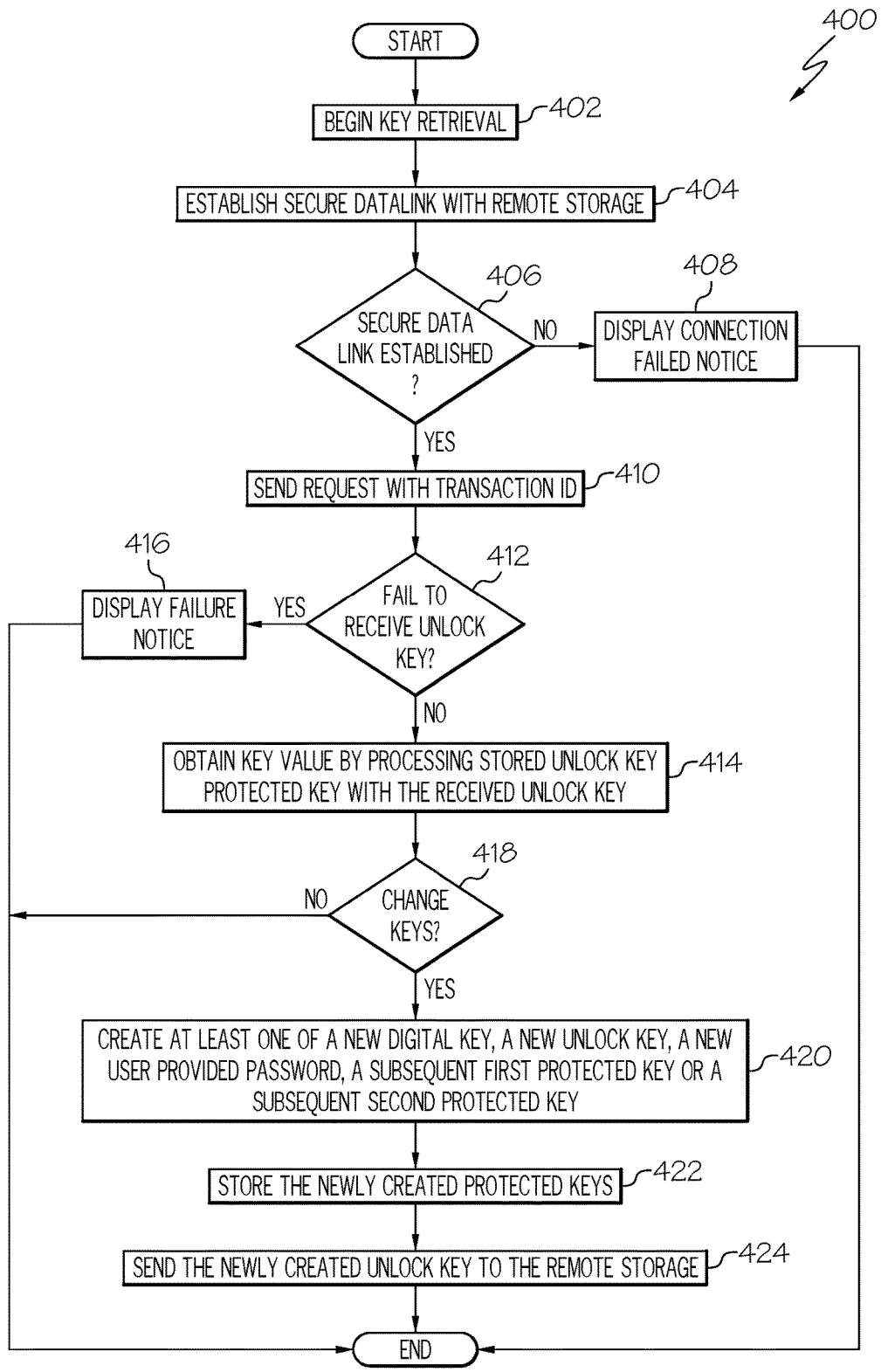
FIG. 4 illustrates an unlock key retrieval process, according to an example.

FIG. 4 illustrates an unlock key retrieval process 400, according to an example. The unlock key retrieval process 400 is an example of a process performed by a user's device to retrieve the unlock key from a remote storage in order to extract a digital key value that is protected, such as by being encrypted, based on the remotely stored unlock key. An example of a digital key value protected by this unlock key is a master key as is described above. In an example, the user device sent the unlock key value to the remote storage as part of the digital key protection process 200, described above, when the digital key was first created or during a subsequent encryption of the digital key. The unlock key retrieval process 400 in an example is initiated as part of a digital key recovery process started by a user of the user's device. The below processing in an example is able to be performed by suitable components of the device A 150 described above, in particular by the user interface 160, the key generator 162, the protected key storage 164, the remote storage interface 166, and the processor 168.

The unlock key retrieval process 400 starts by the user's beginning, at 402, the key retrieval. A user is able to start the unlock key retrieval process 400, for example, when the user does not remember the user provided password that was also used to protect the digital key. In an example, the user is able to select, such as after a particularly number of failures to enter the correct user provided password, to begin the unlock key retrieval process 400. In some examples, the user is able to begin the unlock key retrieval process 400 at any time the user decides to recover the digital key that is a master key by using the second protected key stored on the user's device, where the second protected key is encrypted based on the unlock key as is described above.

The unlock key retrieval process 400 then establishes, at 404, a secure data link with the remote storage. This secure data link with the remote storage is similar to the secure data links described above with regard to the digital key protection process 200. In some examples, this secure data link is implemented by an SSL protocol that operates to also authenticate the user device to the remote storage. In an example, this secure data link is able to be limited to using a particular network port, such as the above described unlock key recovery port.

A determination is made, at 406, if the secure data link was successfully established. As described above, in some examples the secure data link with the remote storage is only able to be established from a device that is connected to the local area network in a particular manner, such as by being connected to the local device network 108.

If it is determined that the data link is not established, the user device displays a connection failed notice to the user. In an example when the remote storage is connected to the user's home local area network, a connection failed notice may remind the user that unlock key recovery can only be performed while connected to the user's home network.

If it is determined that the data link is established, the unlock key retrieval process 400 continues by sending, at 410, a request for the unlock key. In an example, the request for the unlock key includes the value of the transaction identification, or transaction ID, that was received from the remote storage when the unlock key was initially sent for storage, such as during the digital key protection process 200 described above.

A determination is made, at 412, as to whether there was a failure to receive the unlock key. A failure to receive the unlock key is able to be determined by any occurrence reasonably attributed to not receiving the unlock key, such as not receiving any reply from the remote storage to the request for the unlock key or receiving a message from the remote storage indicating that the unlock key is not being sent. A response from the remote storage may indicate a reason for not sending the unlock key. For example, the transaction ID sent with the request may not be a valid transaction ID value. Further, the provided transaction ID may have been issued to a device when the requested unlock key was stored that had different authorization credentials than the requesting device. In an example, as is described above, the remote storage is able to have a physical button or other input apparatus that is able to be pushed or otherwise activated. The remote storage may deny sending the requested unlock key until that button or other input apparatus is actuated. A response from the remote storage when the request for the unlock key is sent to the remote storage may indicate that the button or other input apparatus has not been pressed or otherwise activated.

If it is determined that there is a failure to receive the unlock key, a notification of the failure is provided in an example by displaying a failure notice displayed, at 416. In an example, the remote storage is able to indicate that the button on the remote storage has to be pressed to allow retrieval of the unlock key. This is an example, of the message indicating that a physical input at a device associated with the remote storage is to be provided. When the message includes such an indication, the displayed failure notice is able to indicate the need to provide that a physical input, such as is provided by pressing the button on the remote storage, in order to successfully retrieve the digital key, such as a master key as is described above, by using the remotely stored unlock key. If the remote storage indicated another reason for not sending the requested unlock key, this reason is also able to be indicated in the displayed failure notice.

If it is determined that there is not a failure to receive the unlock key, the value of the key protected by the unlock key, such as an above described digital key, is obtained, at 414, by processing the stored second protected key with the unlock key received from the remote storage.

After obtaining the digital key value, a determination is made in some examples, at 418, as to whether any of the keys used in the above processes should be changed. In an example, one or more of the digital key, the user provided password, or the unlock key are able to be changed as part of the unlock key retrieval process 400. In this context, the user provided password is considered a key at this stage of processing. Based on various defined criteria, this determination could determine that none of these keys is to be changed. In further examples, some or all of these keys are changed.

If it is determined that one or more keys should be changed, at least one of a new digital key, a new unlock key, a new user provided password, a subsequent first protected key protected based on a user provided password, or a subsequent second protected key protected based on an unlock key is created, at 420. The creation of these values is described above with regards to the digital key protection process 200. When a new digital key is created and/or a new user provided password is provided, a subsequent first protected key is created as is described above with regards to the digital key protection process 200. When a new key and/or a new unlock key is created, a subsequent second protected key is created. Creation of these subsequent protected keys is described above with regards to the digital key protection process 200.

Once new keys, subsequent protected keys, or both, are created, the newly created subsequent protected keys, such as the subsequent first protected key, the subsequent second protected key, or both, are stored, at 422. If a newly created unlock key has been created, it is sent to the remote storage, at 424. An example of the storing and sending of these keys is described above with regards to the digital key protection process 200.

After displaying a failure notice, at 416, after determining that keys are not to be changed, at 418, or after obtaining the key value, at 414, the unlock key retrieval process 400 ends.

Figure 5:
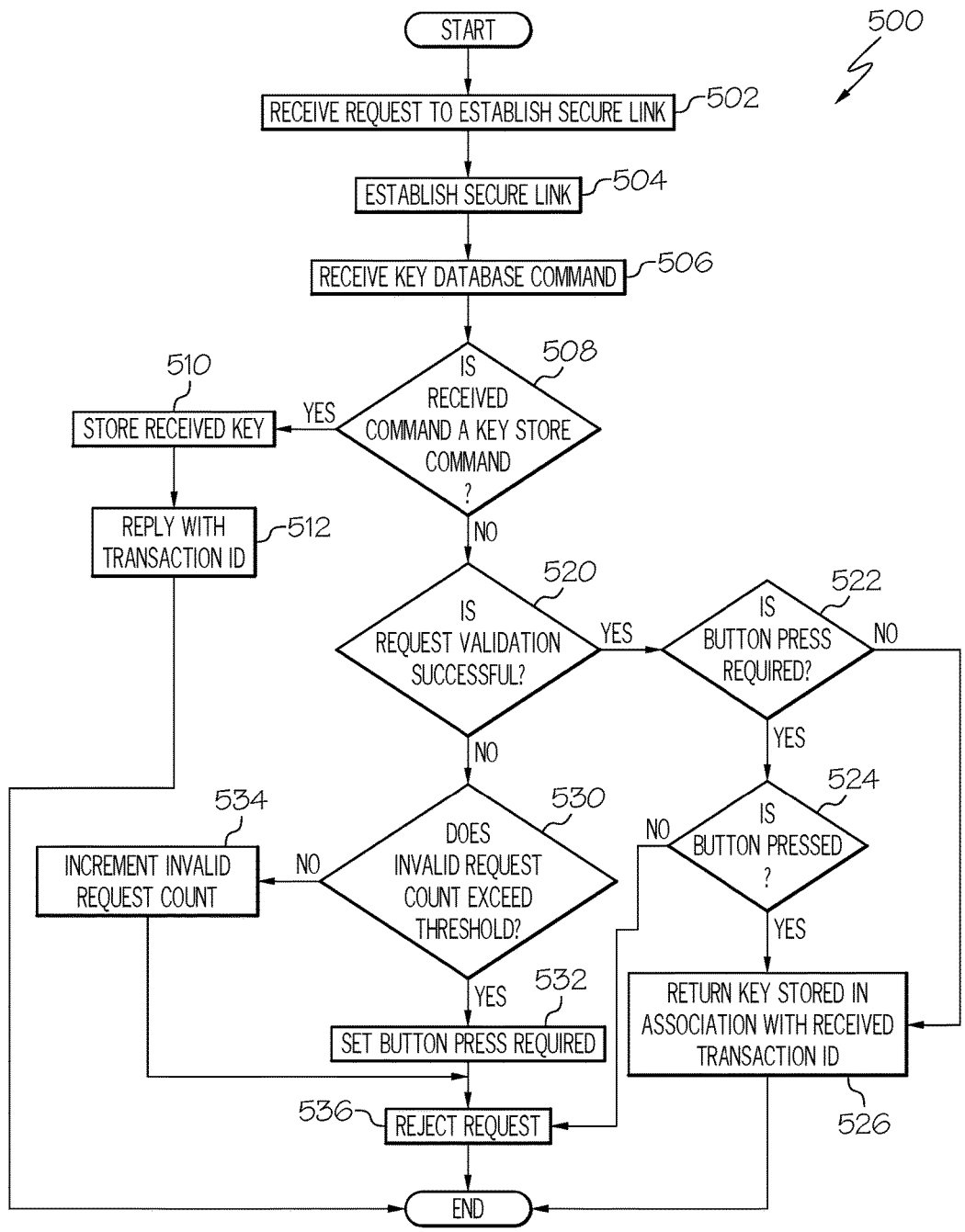
FIG. 5 illustrates a remote storage process, according to an example.

FIG. 5 illustrates a remote storage process 500, according to an example. The remote storage process 500 in an example is performed by a processor within a remote storage device, such as the above described detached remote key database storage 110 or the above described integrated remote key database storage 114. In the example of the integrated remote key database storage 114, the remote storage process 500 is able to be performed by one or more processors within the router 106. The remote storage process 500 in an example, handles receiving commands to store and retrieve unlock keys from user devices. These commands are referred to herein as key database commands The remote storage process 500 begins by receiving a request to establish a secure link, at 502. In an example, the request to establish a secure link includes information to allow authentication of the device originating the request. In an example, the secure link includes communications protected by an SSL protocol that allows a processor performing the remote storage process 500 to authenticate the device that is initiating the establishment of the secure link.

In an example as is described above, a routing function operating outside of the remote storage process 500 performs processing to limit devices that are able to send key database commands to the remote storage device. In some examples, such as in the case of a detached remote key database storage 110, the remote storage process 500 is able to perform functions to limit devices that are able to establish a secure link with the remote storage. For example, the remote storage process 500 is able to limit devices that are able to establish this secure link to devices connected to the same local area network as the detached key database storage. The remote storage process 500 is able to determine if the device requesting to establish the secure data link is on the local area network by determining, for example, that the IP address of the requesting device is within a range associated with the local area network.

A key database command is received, at 506, from an originating device that sent the key database command In an example, key database commands are communicated via a particular port number, such as the unlock key recovery port.

A determination is made, at 508, as to whether the received key database command is a key store command. If this determination is true, the received key storage command contains an unlock key sent from the originating device. If this determination is true, the key received with the key storage command is stored, at 510. In an example, an identification of the originating device is also stored with the unlock key. Any suitable identification of the originating device is able to be used. In an example, the identification is able to be based on information about the originating device obtained in conjunction with establishing the secure link.

After storing the received key, the remote storage process 500 replies, at 512, to the received command with a transaction identification, which is referred to as a transaction ID. This transaction ID in an example is used as an index to the stored unlock keys and requests to retrieve the unlock key send this transaction ID. In some examples, the transaction ID is combined with other information, such as identification of the requesting device based on authentication performed when creating a secure link to request the unlock key.

Returning to the determination, at 508, as to whether the received command is a key storage command, if this determination is false, the command in this example is a key retrieval command The remote storage process 500 in this case determines, at 520, if the request validation for the key retrieval command is successful. In an example, re request validation includes proper authentication of the user or device sending the key retrieval command, and also includes validation of the transaction ID contained in the key retrieval command Authentication of the user or device is able to be performed by any suitable technique, such as user authentication by any technique or by authentication of the device based on information exchanged when setting up a secure data link over which the key retrieval command is received.

Validation of the transaction ID is based in an example on determining that the received transaction ID is associated with a stored key. In some examples, validation is based on determining if the originating device is identified to be the device that sent the requested key for storage. Such identifications are able to be based on, for example, authentication of the requesting device during establishment of the secure link.

If it is determined that the transaction ID is valid, in an example the remote storage process 500 determines, at 522, if a button press is required. In various examples, this determination is able to be based on requiring any activation or operation of a device associated with the remote storage. Criteria for requiring such an activation, or button press, are able to be defined based upon, for example, a device configuration always requiring the button press, a determination that a number of failed attempts were made to retrieve a stored key, any other criteria, or combinations of these.

If it is determined that a button press is required, a determination is made, at 524, as to whether the button is or has been pressed. In various examples, the timing of the button press is able to be defined in any suitable way. For example, the button is able to be determined to be pressed if the button was pressed within a specified time before receiving the key retrieval request. In another example, the button may be required to be pressed while performing the remote storage process 500. In general, any combination of these, or other criteria may be used to determine that the button is pressed.

If it is determined, at 524, or if a button press was determined to not be required, at 522, the key that is associated with the transaction ID received with the request is returned to the originating device, at 526. The remote storage process 500 then ends.

Returning to determining, at 520, as to whether the request validation is successful, if the request is determined to not be valid, a determination is made in an example, at 530, if the number of invalid requests made by a user or for a key exceeds a threshold. In an example, if an invalid request is made by an authenticated user, a count of invalid requests made by that user is incremented. If the request is determined to be invalid because the request was not sent from an authenticated user who had stored a key, the invalid request count for all users is incremented.

In an example, a remote storage may be configured to allow retrieval of unlock keys without pressing a button on the remote storage device. In some of these examples, if the count of invalid requests are received for a particular key or user, the remote storage is able to impose additional restrictions, such as requiring the button on the remote storage to be pressed in order to successfully retrieve that stored key.

If it is determined that the threshold of invalid requests for a key or user has not been exceeded, an invalid transaction ID count is incremented, at 534. If it is determined that the threshold is exceeded, the remote storage configures itself to indicate that a "button press" is requires prior to responding to a key retrieval request, such as is described above with regards to the determination at 522.

Returning to the determination, at 524, as to whether the button is pressed, after incrementing the invalid transaction ID Count, at 534, or after setting the "button press" indicator, the request is rejected, at 538. The remote storage process 500 then ends.

Figure 6:
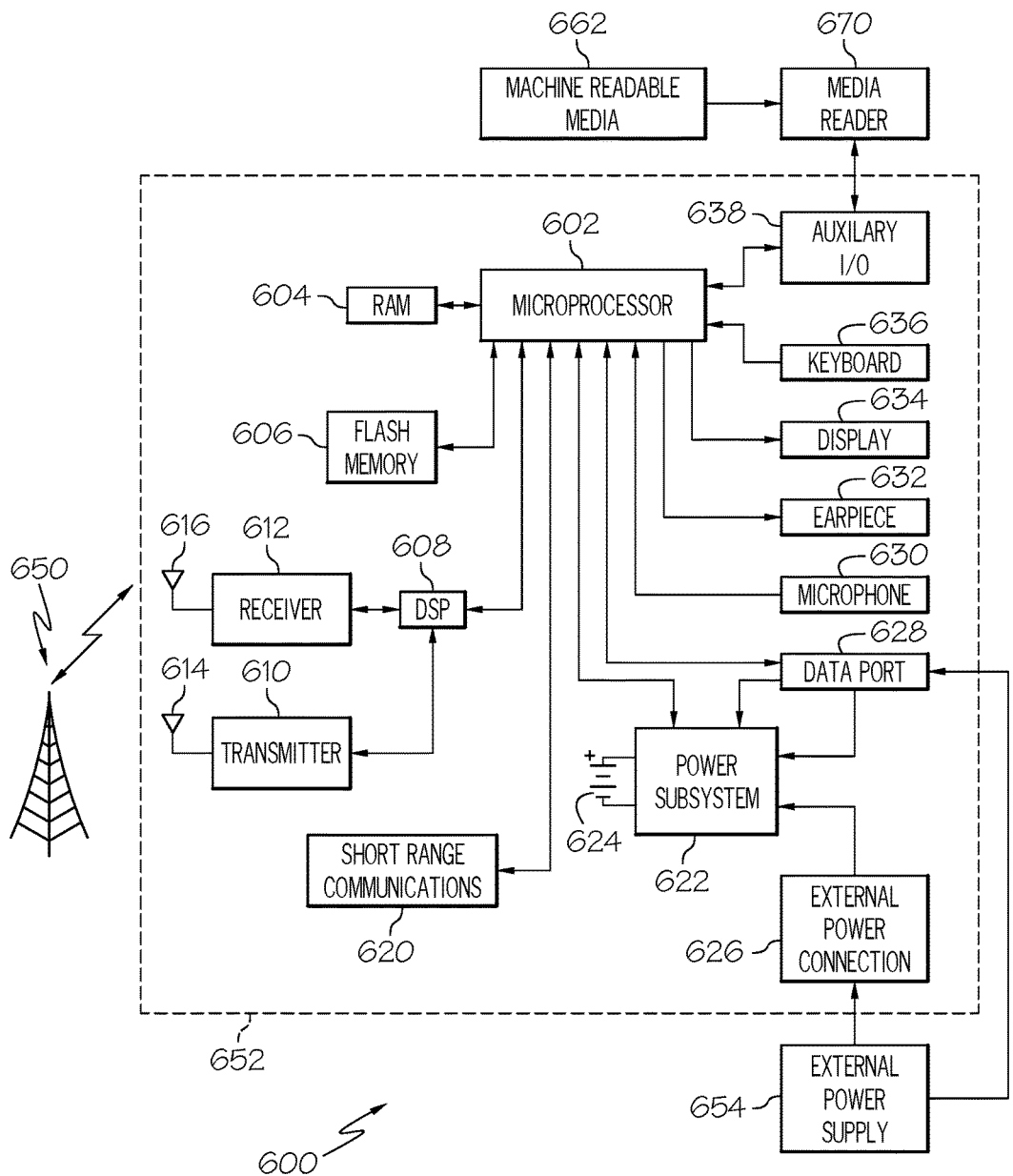
FIG. 6 is a block diagram of an electronic device and associated components in which the systems and methods disclosed herein may be implemented.

FIG. 6 is a block diagram of an electronic device and associated components 600 in which the systems and methods disclosed herein may be implemented. The electronic device 652 in this example is a wireless two-way communication device with one or more of the following: voice, text, and data communication capabilities. Such electronic devices communicate with a wireless voice, text, or data network 650 using a suitable wireless communications protocol. Wireless voice communications may be performed using either an analog or digital wireless communication channel. Data communications allow the electronic device 652 to communicate with other computer systems via the Internet. Examples of electronic devices that are able to incorporate the above described systems and methods include, for example, a mobile device, a smartphone, a data messaging device, a two-way pager, a cellular telephone, a vehicle, a smartwatch or other wearable device, a computer, a tablet, a laptop, a notebook, a wallet device, an accessory, a peripheral, a wireless Internet appliance or a data communication device that may or may not include telephony capabilities, or any other electronic device capable of carrying out the claimed method.

The illustrated electronic device 652 is an example of the above described user devices that are able to create and retrieve digital keys such as the above described master keys. Components illustrated for the electronic device 652 are also able to be used to implement examples of the above described router 106 and remote storage devices.

The illustrated electronic device 652 is an example electronic device that includes two-way wireless communications functions. Such electronic devices may incorporate communication system elements such as a wireless transmitter 610, a wireless receiver 612, and associated components such as one or more antenna elements 614 and 616. A digital signal processor (DSP) 608 performs processing to extract data from received wireless signals and to generate signals to be transmitted. The particular design of the communication system may be dependent upon the communication network and associated wireless communications protocols with which the device is intended to operate.

The electronic device 652 includes a microprocessor 602 that controls the overall operation of the electronic device 652. The microprocessor 602 interacts with the above described communications system elements and also interacts with other device systems. In various examples, the electronic device 652 is able to include one or more of various components such as a flash memory 606, random access memory (RAM) 604, auxiliary input/output (I/O) device 638, data port 628, display 634, keyboard 636, earpiece 632, microphone 630, a short-range communications system 620, a power system 622, other systems, or combinations of these.

One or more power storage or supply elements, such as a battery 624, are connected to a power system 622 to provide power to the circuits of the electronic device 652. The power system 622 includes power distribution circuitry for providing power to the electronic device 652 and also contains battery charging circuitry to manage recharging the battery 624 (or circuitry to replenish power to another power storage element). The power system 622 receives electrical power from external power supply 654. The power system 622 is able to be connected to the external power supply 654 through a dedicated external power connector (not shown) or through power connections within the data port 628. The power system 622 includes a battery monitoring circuit that is operable to provide a status of one or more battery status indicators, such as remaining capacity, temperature, voltage, electrical current consumption, and the like, to various components of the electronic device 652.

The data port 628 is able to support data communications between the electronic device 652 and other devices through various modes of data communications, such as high speed data transfers over an optical communications circuits. Data port 628 is able to support communications with, for example, an external computer or other device. In some examples, the data port 628 is able to include electrical power connections to provide externally provided electrical power to the electronic device 652, deliver electrical power from the electronic device 652 to other externally connected devices, or both. Data port 628 of, for example, an electronic accessory is able to provide power to an electronic circuit, such as microprocessor 602, and support exchanging data between the microprocessor 602 and a remote electronic device that is connected through the data port 628.

Data communication through data port 628 enables a user to set preferences through the external device or through a software application and extends the capabilities of the device by enabling information or software exchange through direct connections between the electronic device 652 and external data sources rather than via a wireless data communication network. In addition to data communication, the data port 628 provides power to the power system 622 to charge the battery 624 or to supply power to the electronic circuits, such as microprocessor 602, of the electronic device 652.

Operating system software used by the microprocessor 602 is stored in flash memory 606. Examples of flash memory 606 are able to include, for example, flash memory, magnetic based storage devices, other volatile or non-volatile data store elements, or the like. The flash memory 606 is an example is able to include the above described data memory 710. Some examples are able to use flash memory 606 that includes a battery backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604. The microprocessor 602 in some examples are able to execute program components, such as is able to be defined in flash memory 606 in one example, that cause the microprocessor 602 to perform the above described processes and methods.

The microprocessor 602, in addition to its operating system functions, is able to execute software applications on the electronic device 652. A set of applications that control basic device operations, including at least data and voice communication applications, is able to be installed on the electronic device 652 during manufacture. In an example, programs and other data used to support the processes described above are able to be installed in the memory of the electronic device 652. Further examples of applications that are able to be loaded onto the device may be a personal information manager (PIM) application having the ability to organize and manage data items relating to the device user, such as, but not limited to, e-mail, calendar events, voice mails, appointments, and task items. The applications are able to include the above described base applications, which may be installed during manufacture or from another trusted and verified source, along with user applications that may be installed at any time.

Further applications may also be loaded onto the electronic device 652 through, for example, the wireless network 650, an auxiliary I/O device 638, Data port 628, short-range communications system 620, or any combination of these interfaces. Such applications are then able to be installed by a user in the RAM 604 or a non-volatile store for execution by the microprocessor 602.

In a data communication mode, a received signal such as a text message or web page download is processed by the communication system, including wireless receiver 612 and wireless transmitter 610, and communicated data is provided the microprocessor 602, which is able to further process the received data. In some examples, the electronic device 652 includes a display, output ports, or combinations of these. In such examples, the received data is able to be processed for output to the display 634, or alternatively, to an auxiliary I/O device 638 or the Data port 628. In examples of the electronic device 652 that include a keyboard 636 or other similar input facilities, a user of the electronic device 652 may also compose data items, such as e-mail messages, using the keyboard 636, which is able to include a complete alphanumeric keyboard or a telephone-type keypad, in conjunction with the display 634 and possibly an auxiliary I/O device 638. Such composed items are then able to be transmitted over a communication network through the communication system.

For voice communications, overall operation of the electronic device 652 is substantially similar, except that received signals are generally provided to an earpiece 632 and signals for transmission are generally produced by a microphone 630. Alternative voice or audio I/O systems, such as a voice message recording system, may also be implemented on the electronic device 652. Although voice or audio signal output is generally accomplished primarily through the earpiece 632, in examples of electronic devices 652 that include a display 634, the display 634 may also be used to provide an indication of the identity of a calling party, the duration of a voice call, or other voice call related information, for example.

Depending on conditions or statuses of the electronic device 652, one or more particular functions associated with a system circuit may be disabled, or an entire system circuit may be disabled. For example, if the battery temperature is low, then voice functions may be disabled, but data communications, such as e-mail, may still be enabled over the communication system.

A short-range communications system 620 provides for data communication between the electronic device 652 and different systems or devices, which need not necessarily be similar devices. For example, the short-range communications system 620 includes an infrared device and associated circuits and components or a Radio Frequency based communication module such as one supporting Bluetooth® communications, to provide for communication with similarly-enabled systems and devices, including the data file transfer communications described above. The short-range communications system is also able to include one or more of components to support communications over wireless links such as Wi-Fi®, Near Field Communications (NFC), any other short range link, or combinations of these A media reader 670 may be able to be connected to an auxiliary I/O device 638 in one example. The media reader 670 is an optional mechanism to allow, for example, loading computer readable program code of a computer program product into the electronic device 652 for storage into flash memory 606. One example of a media reader 670 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 670 is alternatively able to be connected to the electronic device through the Data port 628 or computer readable program code is alternatively able to be provided to the electronic device 652 through the wireless network 650.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system - or other apparatus adapted for carrying out the methods described herein - is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which - when loaded in a computer system - is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-transitory computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A device, comprising:
a key generator that, when operating, creates a first digital key and a first unlock key separate from the first digital key;
a processor that, when operating, creates:
a first protected key by applying a first protection algorithm based on a first user provided password to the first digital key, and
a second protected key based on applying a second protection algorithm based on the first unlock key to the first digital key;
a protected key storage that, when operating, stores the first protected key and the second protected key;
a remote storage interface that, when operating:
sends the first unlock key to a remote storage;
sends a request for the first unlock key to the remote storage; and
receives, based on sending the request for the first unlock key, a message indicating that an operation of a physical input device associated with and attached to the remote storage is to be performed; and
a user interface that, when operating provides an indication to perform the operation of the physical input device based on receipt of the message indicating that an operation of the physical input device associated with and attached to the remote storage is to be performed, and wherein the processor, when operating, retains no copy of the first unlock key after the remote storage interface sends the first unlock key.

2. The device of claim 1, wherein the remote storage interface, when operating, further:
   initiates a secure data communications path to the remote storage;
   determines a reason for a failure to establish the secure data communications path; and
   provides a notification of the reason for the failure.

3. The device of claim 1, further comprising a user interface that when operating, receives an input to initiate a key retrieval process, and
   wherein the remote storage interface, when operating, further sends, based on receipt of the input to initiate the key retrieval process, a request for the first unlock key to the remote storage.

4. The device of claim 3, wherein the remote storage interface, when operating, further:
   receives, based on sending the first unlock key to the remote storage, a transaction identification, and
   wherein the request comprises the transaction identification.

5. The device of claim 3,
   wherein the key generator, while operating, further:
      creates, based on receiving an input to initiate the key retrieval process, a second digital key separate from the first digital key; and
      creates, based on creating the second digital key, a second unlock key separate from the second digital key,
   wherein the processor, while operating, further:
      creates, based on initiation of the key retrieval process, a subsequent first protected key by applying the second protection algorithm based on a second user provided password to the second digital key; and
      creates, based on creation of the second unlock key, a subsequent second protected key by applying the second protection algorithm based on the second unlock key to the second digital key,
   wherein the protected key storage, while operating, further stores the subsequent first protected key and the subsequent second protected key, and
   wherein the remote storage interface, while operating, sends the second unlock key to a remote storage.

6. The device of claim 3, wherein the remote storage interface, when operating, further receives, based on sending the request for the first unlock key, the first unlock key,
   wherein the processor, when operating, extracts, based on receiving the input to initiate the key retrieval process, the first digital key by applying the received first unlock key to the second protected key,
   wherein the user interface, when operating, further receives, based on the extraction of the first digital key, a second user provided password,
   wherein the processor, when operating, further creates a subsequent first protected key by applying the first protection algorithm based on the second user provided password to the first digital key, and
   wherein the protected key storage, while operating, further stores the subsequent first protected key by replacing the first protected key with the subsequent first protected key.

7. The device of claim 6,
   wherein the key generator, while operating, further creates, based on the extraction of the first digital key by the processor, a second unlock key separate from the first digital key,
   wherein the processor, while operating, further creates, based on creation of the second unlock key, a subsequent second protected key by applying a protection algorithm based on the second unlock key to the first digital key,
   wherein the remote storage interface, while operating, further stores, based on creation of the subsequent second protected key, the subsequent second protected key by replacing the second protected key with the subsequent second protected key, and
   wherein the remote storage interface, while operating, further sends the subsequent second protected key to a remote storage.

8. The device of claim 1, where the remote storage comprises a local network router.

9. The device of claim 8, wherein the physical input device comprises a physical user interface element on the local network router that is operable by a user pressing the physical user interface element.

10. A method, comprising:
    creating a first digital key;
    creating a first protected key by applying a first protection algorithm based on a first user provided password to the first digital key;
    creating a first unlock key separate from the first digital key;
    creating a second protected key by applying a second protection algorithm based on the first unlock key to the first digital key;
    storing the first protected key and the second protected key;
    sending the first unlock key to a remote storage;
    sending a request for the first unlock key to the remote storage;
    receiving, based on sending the request for the first unlock key, a message indicating that an operation of a physical input device associated with and attached to the remote storage is to be performed; and
    providing an indication to perform the operation of the physical input device based on receipt of the message indicating that an operation of the physical input device associated with and attached to the remote storage is to be performed, and
    wherein no copy of the first unlock key is retained after the sending the first unlock key.

11. The method of claim 10, further comprising:
    initiating a secure data communications path to the remote storage;
    determining a reason for a failure to establish the secure data communications path; and
    providing a notification of the reason for the failure.

12. The method of claim 10, further comprising:
    initiating a key retrieval process; and
    sending, based on initiating the key retrieval process, a request for the first unlock key to the remote storage.

13. The method of claim 12, further comprising:
    receiving, based on sending the request for the first unlock key, the first unlock key;
    extracting, based on initiating the key retrieval process, the first digital key by applying the received first unlock key to the second protected key;
    receiving, based on extracting the first digital key, a second user provided password;

creating a subsequent first protected key by applying the first protection algorithm based on the second user provided password to the first digital key; and storing the subsequent first protected key by replacing the first protected key with the subsequent first protected key.

14. The method of claim 13, further comprising
creating, based on extracting the first digital key, a second unlock key separate from the first digital key;

creating, based on creating the second unlock key, a subsequent second protected key by applying a protection algorithm based on the second unlock key to the first digital key;

storing, based on creating the subsequent second protected key, the subsequent second protected key by replacing the second protected key with the subsequent second protected key; and sending the subsequent second protected key to a remote storage.

15. The method of claim 10, further comprising:
receiving a data packet;
determining the data packet is a key database command comprising one of a key storing command or a key retrieval request;
determining whether the data packet is received from an external network or from a local network;
denying delivery of the data packet based on the determine that the data packet is a key storage command and based on determining that the data packet is received from the external network; and
delivering the data packet based on the determine that the data packet is a key storage command and based on determining that the data packet is received from the local network.

16. The method of claim 15, wherein the determining the data packet is a request for a decryption key comprises determining that the data packet specifies a destination comprising a network port number that is associated with key database commands.

17. The method of claim 15, wherein the external network comprises a remote network bridged to the local network, and
wherein the determining that the data packet is received from the external network comprises determining that the data packet is received from the remote network bridged to the local network.

18. The method of claim 15, wherein the key database command comprises a key storage command further comprising a decryption key, further comprising:
receiving, based on the delivering, the data packet;
storing the decryption key in association with an identification of a sender of the data packet; and
sending, based on the storing, a response comprising a transaction identifier to the sender.

19. The method of claim 18, further comprising:
receiving a request for the decryption key, the request comprising the transaction identifier;
determining that the operation of the physical input device has been performed; and
sending, based on receiving the request for the decryption key and based on determining the operation of the physical input device has been performed, the decryption key.

20. The method of claim 15, further comprising:
determining, based on the determining that the data packet is the key retrieval request, that the key retrieval request is an invalid key retrieval request; and
determining, based on determining that the key retrieval request is an invalid key retrieval request, whether a number of invalid requests exceeds a threshold, and
wherein the message indicating that an operation of a physical input device associated with and attached to the remote storage is to be performed is sent based on determining the number of invalid requests exceeds the threshold.

* * * * *